(12) United States Patent
Kloeppel et al.

(10) Patent No.: US 9,481,123 B2
(45) Date of Patent: Nov. 1, 2016

(54) LABELING DEVICE FOR A THERMOFORMING SYSTEM AND METHOD

(75) Inventors: Holger Kloeppel, Ortenberg (DE);
Martin Heidkamp, Glauburg (DE);
Peter Walter, Ortenberg (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 14/345,819

(22) PCT Filed: Jul. 25, 2012

(86) PCT No.: PCT/EP2012/064574
§ 371 (c)(1),
(2), (4) Date: Mar. 19, 2014

(87) PCT Pub. No.: WO2013/041272
PCT Pub. Date: Mar. 28, 2013

(65) Prior Publication Data
US 2014/0224428 A1    Aug. 14, 2014

(30) Foreign Application Priority Data

Sep. 20, 2011 (DE) ......................... 10 2011 083 045

(51) Int. Cl.
*B29C 51/16* (2006.01)
*B29C 49/24* (2006.01)

(52) U.S. Cl.
CPC ........... *B29C 51/165* (2013.01); *B29C 51/167* (2013.01); *B29C 2049/2443* (2013.01); *Y10T 156/12* (2015.01)

(58) Field of Classification Search
CPC .............. B29C 51/165; B29C 51/167; B29C 2049/2443; Y10T 156/1057; Y10T 156/12
See application file for complete search history.

(56) References Cited

U.S. PATENT DOCUMENTS

| | | | |
|---|---|---|---|
| 4,332,635 A | 6/1982 | Holbrook et al. | |
| 4,787,833 A | 11/1988 | Krall | |
| 4,853,169 A | 8/1989 | Kaminski | |
| 6,167,935 B1 | 1/2001 | Heider et al. | |
| 2010/0006233 A1* | 1/2010 | Deckert | B65C 9/1819 156/510 |

FOREIGN PATENT DOCUMENTS

| | | |
|---|---|---|
| DE | 19535033 | 3/1997 |
| DE | 10011386 | 9/2000 |
| EP | 0421641 | 4/1991 |

OTHER PUBLICATIONS

International Search Report for Application No. PCT/EP2012/064574 dated Nov. 23, 2012 (English Translation, 3 pages).

\* cited by examiner

*Primary Examiner* — Mark A Osele
*Assistant Examiner* — Christopher C Caillouet
(74) *Attorney, Agent, or Firm* — Michael Best & Friedrich LLP

(57) ABSTRACT

The invention relates to a labeling device (10) for a thermoforming system (100) comprising: a supply device (11) for at least one label reel (12) having a plurality of labels (1); a first cutting device (26) for separating each label (1) from the at least one label reel (12); a preferably drum-like transfer device (45) for transferring each label (1) separated from the at least one label reel (12) to a mold (102, 103) of a molding tool (101) for producing a container (80), wherein the molding tool (101) comprises several molds (102, 103), and wherein all containers (80) can be produced in the respective molds (102, 103) in one manufacturing cycle by the molding tool (101). According to the invention, the first cutting device (26) is assigned to multiple molds (102, 103) of the molding tool (101) and a label feed device (35) is provided, said device feeding each label (1) separated from the at least one label reel (12) by the cutting device (26) to the transfer devices (45) of the molds (102, 103).

9 Claims, 2 Drawing Sheets

LABELING DEVICE FOR A THERMOFORMING SYSTEM AND METHOD

BACKGROUND OF THE INVENTION

The invention relates to a labeling device for a thermoforming system. The invention relates further to a method for operating an inventive labeling device.

Such a labeling device as a component of a thermoforming system is known from the German patent specification DE 195 35 033 B4 of the applicant. In the case of said known labeling device, a label is supplied to each mold of a molding device, said label being reeled off from a label reel assigned to the respective mold and being separated from the label reel by a cutting device in the region of a drum-like transfer device for transferring the label to the mold. Particularly in the case of thermoforming systems which comprise a relatively large number of molds, for example more than ten molds, a labeling device according to the prior art is relatively complex and of sophisticated construction because said device requires a plurality of cutting devices and a plurality of labeling feeds or, respectively, label reels. The space requirements are furthermore relatively large due to the cutting devices, in particular in the region of the transfer devices for transferring the labels to the molds. In addition, all of the supply devices for the label reels require a corresponding effort and expense, in particular the changing of the label reels.

SUMMARY OF THE INVENTION

On the basis of the prior art described above, the aim underlying the invention is to further develop a labeling device for a thermoforming system in such a way that said labeling device has a relatively simple design and manages with a number of cutting devices for separating the labels from the label reels which is reduced with respect to the prior art as well as with a smaller number of label reels even when a relatively large number of molds are used. In addition, a particularly clear layout of the thermoforming system is made possible by means of a spatial separation of the cutting devices for the labels from the molding tool of the thermoforming system or from the transfer devices for transferring the labels to the molds. Said aim is met in accordance with the invention in that the first cutting device (for crosscutting the labels) is assigned to multiple molds of the forming device and in that a label feed device is provided which feeds each of the labels separated by means of the first cutting device from the at least one label reel to the transfer devices of the molds. According to the invention, this facilitates a disposal of the first cutting device at a distance or spaced apart from the transfer devices for transferring the labels to the molds, wherein a reduced number of the first cutting devices is required with respect to the prior art as a result of the assignment to a plurality of molds.

Provision is made in one embodiment of the invention, which is particularly preferred with regard to the kinematics for the labeling device, for the molding tool to have a plurality of longitudinal rows which each comprise several molds and for a separate first cutting device and a separate label feed device to be assigned to each longitudinal row.

In order to facilitate a separation of the individual labels from the label reel during the removal of the labels from the label reel without said labels or said label reels having to be stopped in the region of a cutting device in order to meet this end, provision is furthermore made for the first cutting device to be embodied as a rotary cutting device having at least one cutting knife that extends perpendicularly to the longitudinal direction of the labels.

Because the labels of a label reel have been used up after producing a certain number of containers, it is necessary to connect the end of the initially utilized label reel to the beginning of a new label reel. This process is usually performed with adhesive tapes. The transition region which is provided with the adhesive tape and is located between the last label of an (old) label reel and the labels of the new label reel is not intended for use in the molds. In order to very easily exclude this intermediate region, provision is therefore made for an adhesive joint excising device to be disposed between the first cutting device and the label feed device.

In order to facilitate a relatively high performance while maintaining a relatively simple design of the label feed device, provision is made in a particularly preferred embodiment of the label feed device for said device to be designed as an endless rotating conveyor belt, preferably in the form of a toothed belt.

The conveyor belt can be designed very compactly and simply if the strand of the conveyor belt is aligned perpendicularly to the horizontal and has at least one entraining cam, wherein the conveyor belt height is lower than the label and wherein an edge of the label in the region of the conveyor belt rests on a base plate. In so doing, the conveyor belt provides only the feed motion for the label while said label is supported on the base plate and slides along said base plate.

Provision is made in a particularly preferable manner in the aforementioned embodiment of the conveyor belt for a switching element to be assigned in each case to the conveyor belt in the region of the molds. By means of said switching element, a label conveyed with the conveyor belt is guided from said conveyor belt to the preferably drum-like transfer device. Provision is also thereby made in a particularly preferable manner for the switching element to be pivotably mounted in an axis.

In order to keep the number of label reels used relatively low even when there are a relatively high number of molds of the molding tool, provision can furthermore be made for a second cutting device to be provided which comprises a cutting knife disposed in the longitudinal direction of the label reel, said cutting knife separating the label reel in at least two label strip sections, for the second cutting device to be disposed in the direction of transportation of the labels upstream of the first cutting device and the for each label strip section to be assigned to a longitudinal row of molds.

The invention also comprises a method for operating an inventive labeling device. According to the invention, at least one label is fed to a transfer device assigned to a mold during the molding process of the containers, and the labels are simultaneously fed to the molds by means of the transfer devices. As a result, a relatively high efficiency of the thermoforming system is made possible. In addition, a common drive can be used for the normally multiple transfer devices so that the effort and expense involved in driving the transfer devices can be reduced.

BRIEF DESCRIPTION OF THE DRAWINGS

Further advantages, features and details of the invention ensue from the following description of preferred exemplary embodiments as well as with the aid of the drawings.

In the drawings.

DETAILED DESCRIPTION

Figure 1:
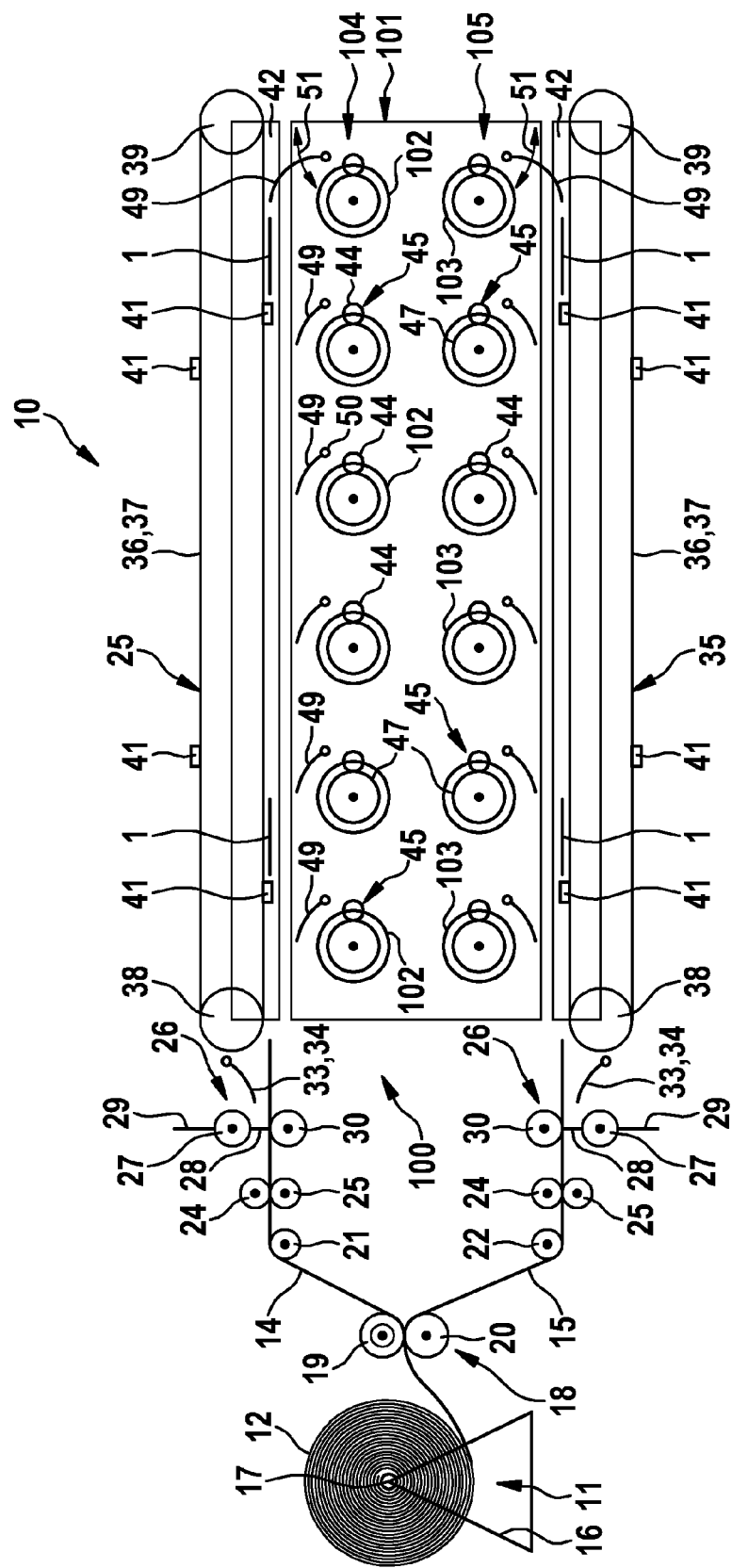
FIG. 1 shows a greatly simplified depiction of an inventive labeling device for a thermoforming system in a top view.

Identical components or components having the same function are provided with the same reference numerals in the figures.

Figure 2:
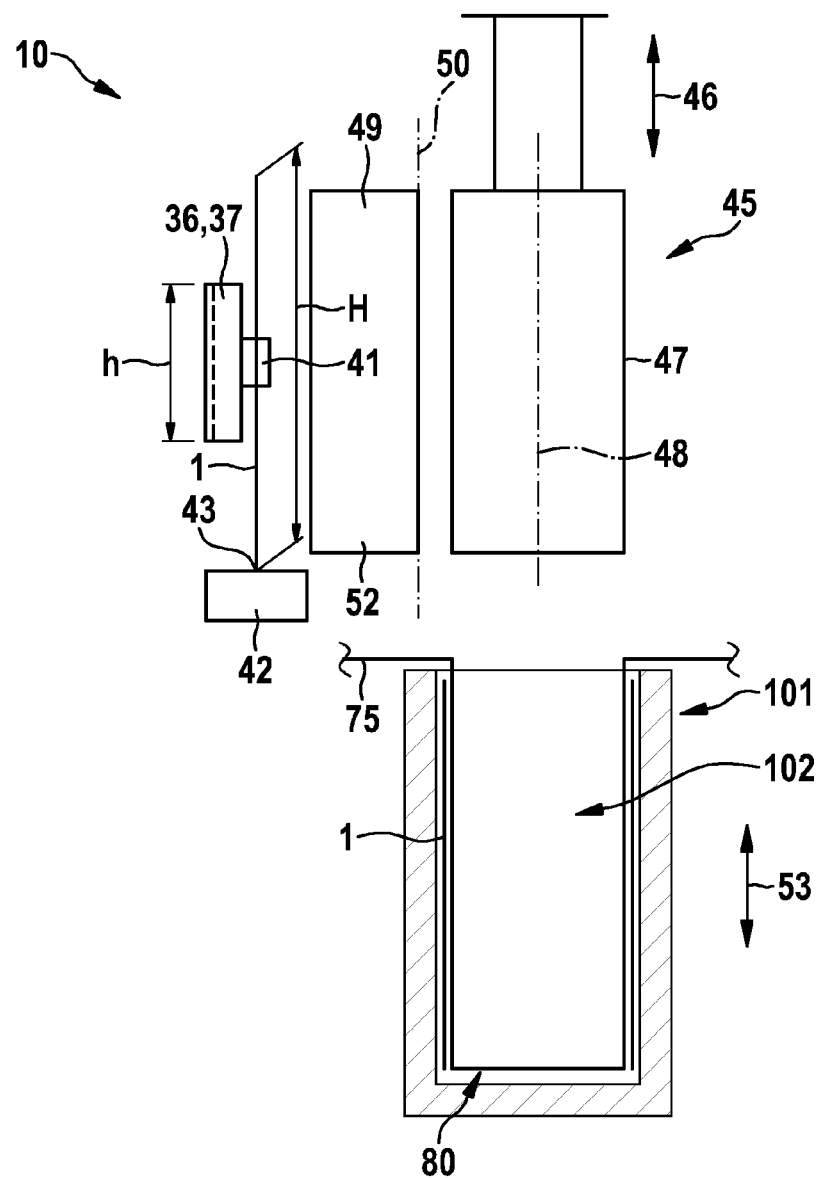
FIG. 2 shows a section through the labeling device pursuant to FIG. 1 in the region of a transfer device for transferring a label from a label feed device to a drum-like transfer device.

In the figures, an inventive labeling device 10 is depicted as said device serves as a component of a thermoforming system 100. By means of the thermoforming system 100, cup-shaped containers 80 that are only depicted in FIG. 2 are produced from a thermoformable web of material 75 on the outer face or outer wall of which at least one label 1 is applied in each case.

When labeling containers 80 in thermoforming systems 100, there are basically two types of labeling. With regard to the first type, the respective label 1 is first applied to the solidified outer wall of the container 80 after said container 80 has been molded and removed from a mold serving to shape the container 80. With regard to the second type, which is used in a thermoforming system 100 comprising a labeling device 10 according to the invention, this type of labeling is referred to as a so-called inmold labeling. When using this type of labeling, the labels 1 are already introduced into a molding tool 100 of the thermoforming system 100 prior to the molding of the containers 80. To this end, the molding tool 101, which is only depicted in a very simplified manner in FIG. 1, has a mold 102, 103 for each of the containers 80. An endless material web 75, which was previously heated, is thereby introduced into said molds by means of corresponding stamping tools or by means of under- or overpressure. In so doing, the corresponding section of the heated and deformed material web 75 contacts the label 1. After the material web 75 has solidified, the containers 80 together with the label 1 are formed from the molds 102, 103. Such a thermoforming system 100, which incidentally is not a component of the present invention, is known per se and is therefore not described in detail.

In the exemplary embodiment, the molding tool 101 has respectively six molds 102 and six molds 103, which are disposed in each case along a straight line and thus form a longitudinal row 104 or 105. The molding tool 101 therefore comprises in total twelve molds 102, 103, wherein in each case all of the containers 80 are simultaneously molded or formed in the molds 102, 103.

In addition, it should be mentioned that it, of course, also lies within the scope of the invention to configure the thermoforming system 100 in such a manner that only one of the longitudinal rows 104, 105 is provided or else that more than two longitudinal rows 104, 105 are provided. It is furthermore also, of course, conceivable that each of the longitudinal rows 104, 105 have more or less than six molds 102, 103.

Figure 3:
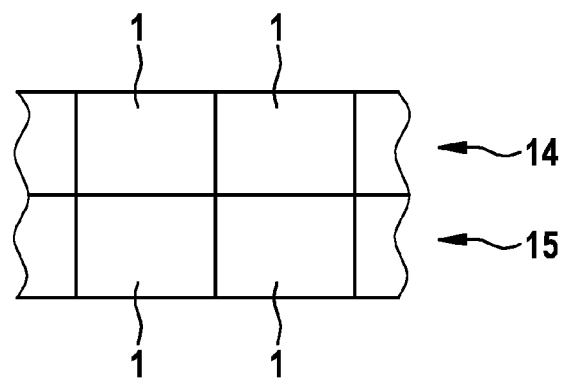
FIG. 3 shows a section of a label reel comprising labels in a top view.

The labeling device 10 comprises a supply device (11) in the region of which the labels 1 are supplied in the form of a label reel 12. The individual labels 1 are disposed in each case directly adjacent to one another, without backing paper or something similar on the label reel 12, in two label strip sections 14, 15 arranged one above the other, as is depicted in FIG. 3. As a result, the backside of the labels 1 which faces the container wall is coated preferably at least area wise with a heat-sealing or hot-melt adhesive. The supply device 11 for the label reel 12 comprises, for example, a support device 16, on which the label reel 12 is mounted in one axis 17.

The labels 1 are removed preferably continuously from the supply device 11 for the label reel 12 by means of non-depicted removal rollers, which are designed in particular as friction rollers and between which the label reel 12 is guided, and are delivered to a longitudinal cutting device 18 which comprises a longitudinal cutting knife 19 that interacts with a counter roller 20. The label reel 12 is thereby guided between the longitudinal cutting knife 19 and the counter roller 20, wherein the two aforementioned label strip sections 14, 15 comprising respectively labels 1 are formed by means of the longitudinal cutting knife 19. Each of the two label strip sections 14, 15 is subsequently supplied, for example, by means of a deflection roller 21, 22 and two continuously driven feed rollers 24, 25 to a transverse cutting device 26 for the labels 1.

The transverse cutting device 26 is embodied as a rotary cutting knife 27 having two transverse cutting blades which are disposed 180E offset to one another and interact with a counter roller 30. The labels 1 which are each directly adjacent to one another are separated from the respective label strip sections 14, 15 by means of the transverse cutting device 26, wherein the transverse cutting blades 28, 29 of the rotary cutting knives 27 are aligned perpendicularly to the direction of transportation of the label strip sections 14, 15 in the region of the transverse cutting device 26 or perpendicularly to the longitudinal direction of the labels 1.

An adhesive joint excising device 33 comprising a removal gate 34 that can be pivoted into the conveying path of the labels 1 adjoins the transverse cutting device 26. By means of the removal gate 34, transition regions between two label reels 12, which are not intended to be used in the molds 102, 103 and are formed when replacing a label reel 12, are removed.

After being separated by means of the transverse cutting device 26, the labels 1 separated from the label strip sections 14, 15 enter in each case into a label feed device 35 which feeds the labels 1 to the individual molds 102 or 103 of the molding tool 101. The label feed device 35 comprises a preferably continuously driven conveyor belt 36 which is designed as a toothed belt. The strand 37 of the conveyor belt 36 runs around two deflection rollers 38, 39, at least one of the deflection rollers 38, 39 being driven. As can be seen when considering FIGS. 1 and 2 together, the strand 37 is aligned vertically to the horizontal and has entraining cams 41 for the labels 1 on the outer side thereof, which are spaced apart from one another at uniform distances. As can be further seen with the aid of FIG. 2, the height h of the strand 37 is less than the height H of a label, the strand 37 being, corresponding to FIG. 2, disposed approximately centrally aligned with respect to the label 1. A base plate 42 is further disposed in the region of the label feed device 35 or the conveyor belt 36, on which base plate the labels 1 rest and slide along by means of a lower (longitudinal) edge 43 during the transport thereof by the entraining cams 41 of the conveyor belt 36.

In alignment with the molds 102, 103 of the molding tool 101, a transfer device 45 for transferring a label 1 from the label feed device 35 to each of the molds 102, 103 is assigned to the respective mold 102, 103. The transfer device 45 comprises, corresponding to FIG. 2, a transport drum 47 which can be moved in the direction of the double arrow 46 in a reciprocal manner and interacts with a switchable counter roller 49. The transport drums 47, which are preferably connected to one another by means of a common drive, can thereby be moved between a first, raised position in which the transport drums 47 are located at the height of the conveyor belt 36 and a lowered position in which the labels 1 can dip into the molds 102, 103. The transport drums 47 preferably have suction openings on the outer walls thereof, said openings being connected to a vacuum source that is not depicted. By means of the transport drum 47, each label 1 can be picked up by the conveyor belt 36. By means of a corresponding rotation of the transport drum 47 about the longitudinal axis 48 thereof, the conveyor belt 36 picks up the corresponding label 1 and subsequently—in the position lowered into the mold 102, 103, for example by switching off the vacuum—delivers said label to the wall of the mold 102, 103 and positions it there.

It is additionally stated that the transfer device 45 can also be designed as a function of the shape of the molds 102, 103 or the shape of the containers other than described above. Thus, transfer devices 45 are known, for example, from the prior art, in which two pin-like sleeves that are disposed concentrically with respect to one another are provided, a slot being configured in the outer sleeve. The labels 1 can be inserted via the slot into the annular interior space between the two sleeves, where said labels can be held or positioned by vacuum at the wall of the inner sleeve, said wall having holes. The inner sleeve can subsequently be moved into the region of the molds 102, 103 while the outer sleeve remains at the location thereof.

A switching element 49 is furthermore assigned to each of the transport drums 47, said switching element being disposed in an individually pivotable manner in an axis 50 in the direction of the double arrow 51 by means of drives that are not depicted. The switching element 49 serves to discharge a label 1 from the conveyor belt 36 to the transport drum 47. To this end, the switching element 49 has a correspondingly shaped sheet metal plate 52 which guides a label 1 discharged from the conveyor belt 36 directly to the transport drum 47, where said label is picked up by the transport drum 47 by means of the aforementioned vacuum while being simultaneously rotated about the longitudinal axis 48 thereof.

The labeling device 10 described to this point operates as follows: After forming the two label strip sections 14, 15 by means of the longitudinal cutting device 18, said two label strip sections 14, 15 are synchronously fed to the transverse cutting devices 26 which serve to separate the labels 1 from the label strip sections 14, 15. The separated labels 1 are subsequently picked up by the conveyor belt 36 via the entraining cams 41 and transported in the direction of the individual molds 102, 103. The individual labels 1 are discharged in the region of the molds 102, 103 by means of the switching elements 49 which are pivoted in each case into the conveying path of the labels 1. To this end, it is essential that the individual switching elements 49 are actuated in each case only once for the six consecutive labels 1 of a longitudinal row 104, 105; so that in each case only one label 1 is fed to a mold 102 or 103. After activating the switching elements 49, the labels 1, as previously mentioned, enter into the region of the transport drums 47, where the respective label 1 is wound around the circumference of the transport drum 47. The transport drums 47 are subsequently immersed together in the molds 102, 103 of the thermoforming tool 101 and transferred to said molds. Afterwards the transport drums 47 are again moved into their original, raised position in order to pick up the required labels 1 for the next manufacturing cycle. After emerging from the molds 102, 103, the heated material web 75 can be brought into superposition with the molds 102, 103 in order to form the containers 80 by means of thermoforming. In order to accelerate the transfer of the labels 1 to the molds 102, 103 as well as to simplify handling of the material web 75, provision can be made for the molding tool 101 to be disposed in the direction of the double arrow 53 so that it can be raised and lowered.

The label device 10 previously described can be varied or modified in a variety of ways without deviating from the concept of the invention. This consists of the use of a common transverse cutting device 26 for multiple molds 102, 103 of a thermoforming system 100 and a label feed device 35 which feeds the separated labels 1 to the respective molds 102, 103.

The invention claimed is:

1. A labeling device (10) for a thermoforming system (100) comprising: a supply device (11) for at least one label reel (12) having a plurality of labels (1); a first cutting device (26) for separating each label (1) from the at least one label reel (12); a transfer device (45) for transferring each label (1) separated from the at least one label reel (12) to a mold (102, 103) of a molding tool (101) for producing a container (80), wherein the molding tool (101) comprises several molds (102, 103), and wherein all containers (80) can be produced in respective molds (102, 103) in one manufacturing cycle by the molding tool (101), characterized in that the first cutting device (26) is assigned to multiple molds (102, 103) of the molding tool (101) and a label feed device (35) is provided, said device feeding each label (1) separated from the at least one label reel (12) by the first cutting device (26) to transfer devices (45) of the molds (102, 103), characterized in that the label feed device (35) is an endless rotating conveyor belt (36), and characterized in that a strand (37) of the conveyor belt (36) is aligned perpendicularly to horizontal and has at least one entraining cam (41) for each label (1), in that the conveyor belt (36) has a lower height (h) than the label (1) and in that the label (1) rests with an edge (43) in a region of the conveyor belt (36) on a base plate (42).

2. The labeling device according to claim 1, characterized in that the molding tool (101) has a plurality of longitudinal rows (104, 105) comprising respectively several molds (102, 103) and in that a separate first cutting device (26) and a separate label feed device (35) are assigned to each longitudinal row (104, 105).

3. The labeling device according to claim 1, characterized in that the first cutting device (26) is a rotary cutting device (27) comprising at least one cutting knife (28, 29) which extends perpendicularly to a longitudinal direction of the labels (1).

4. The labeling device according to claim 1, characterized in that an adhesive joint excising device (33) is disposed between the first cutting device (26) and the label feed device (35).

5. The labeling device according to claim 1, characterized in that a switching element (49) is assigned in each case to the conveyor belt (36) in a region of the molds (102, 103), a label (1) conveyed on the conveyor belt (36) being guided from said conveyor belt (36) to the transfer device (45) by means of said switching element, and in that the switching element (49) is pivotably mounted in an axis (50).

6. The labeling device according to claim 1, characterized in that a second cutting device (18) is provided which comprises a cutting knife (19) disposed in a longitudinal direction of the label reel (12), said knife separating the label reel (12) in at least two label strip sections (14, 15), in that the second cutting device (18) is disposed in a direction of transportation of the labels (1) upstream of the first cutting device (26) and in that the label strip sections (14, 15) are assigned in each case to a longitudinal row (104, 105) of molds (102, 103).

7. A method for operating a labeling device (10) for a thermoforming system (100) comprising: a supply device (11) for at least one label reel (12) having a plurality of labels (1); a first cutting device (26) for separating each label (1) from the at least one label reel (12); a transfer device (45) for transferring each label (1) separated from the at least one label reel (12) to a mold (102, 103) of a molding tool (101) for producing a container (80), wherein the molding tool (101) comprises several molds (102, 103), and wherein all containers (80) can be produced in respective molds (102, 103) in one manufacturing cycle by the molding tool (101), characterized in that the first cutting device (26) is assigned to multiple molds (102, 103) of the molding tool (101) and a label feed device (35) is provided, said device feeding each label (1) separated from the at least one label reel (12) by the first cutting device (26) to transfer devices (45) of the molds (102, 103), characterized in that at least one label (1) is fed to the transfer device (45) assigned to a mold (102, 103) during a molding process of the containers (80) in the molds (102, 103) of the molding tool (101) and in that the labels (1) are simultaneously fed to the molds (102, 103) by means of the transfer devices (45), and characterized in that the label feed device (35) is continuously operated and in that a switching element (49) is pivoted into a conveying path of a label (1) in order to discharge said label (1) from the label feed device (35).

8. A labeling device (10) for a thermoforming system (100) comprising: a supply device (11) for at least one label reel (12) having a plurality of labels (1); a first cutting device (26) for separating each label (1) from the at least one label reel (12); a transfer device (45) for transferring each label (1) separated from the at least one label reel (12) to a mold (102, 103) of a molding tool (101) for producing a container (80), wherein the molding tool (101) comprises several molds (102, 103), and wherein all containers (80) can be produced in respective molds (102, 103) in one manufacturing cycle by the molding tool (101), characterized in that the first cutting device (26) is assigned to multiple molds (102, 103) of the molding tool (101) and a label feed device (35) is provided, said device feeding each label (1) separated from the at least one label reel (12) by the first cutting device (26) to transfer devices (45) of the molds (102, 103), wherein the label feed device (35) is an endless rotating conveyor belt (36) in the form of a toothed belt, and characterized in that a strand (37) of the conveyor belt (36) is aligned perpendicularly to horizontal and has at least one entraining cam (41) for each label (1), in that the conveyor belt (36) has a lower height (h) than the label (1) and in that the label (1) rests with an edge (43) in a region of the conveyor belt (36) on a base plate (42).

9. The labeling device according to claim 8, characterized in that a switching element (49) is assigned in each case to the conveyor belt (36) in a region of the molds (102, 103), a label (1) conveyed on the conveyor belt (36) being guided from said conveyor belt (36) to the drum-like transfer device (45) by means of said switching element, and in that the switching element (49) is pivotably mounted in an axis (50).

\* \* \* \* \*